United States Patent
Dyrlund et al.

(10) Patent No.: US 9,770,859 B2
(45) Date of Patent: Sep. 26, 2017

(54) APPARATUS FOR PRODUCING LAMINATED FABRIC PLY STRIPS

(71) Applicant: The Goodyear Tire & Rubber Company, Akron, OH (US)

(72) Inventors: Christopher David Dyrlund, Canton, OH (US); Gary Robert Burg, Massillon, OH (US); Hongbing Chen, Broadview Heights, OH (US); Nathan Andrew Hunt, Lewis Center, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 176 days.

(21) Appl. No.: 14/575,063

(22) Filed: Dec. 18, 2014

(65) Prior Publication Data

US 2016/0176096 A1 Jun. 23, 2016

(51) Int. Cl.
*B29C 47/02* (2006.01)
*B29C 47/14* (2006.01)
(Continued)

(52) U.S. Cl.
CPC .......... *B29C 47/128* (2013.01); *B29C 47/027* (2013.01); *B29C 47/085* (2013.01); *B29C 47/0828* (2013.01); *B29C 47/0837* (2013.01); *B29C 47/28* (2013.01); *B29D 30/38* (2013.01); *B29C 47/109* (2013.01); *B29C 47/1036* (2013.01); *B29C 47/1045* (2013.01); *B29C 47/145* (2013.01); *B29C 47/367* (2013.01);
(Continued)

(58) Field of Classification Search
CPC .............. B29C 47/027; B29C 47/0828; B29C 47/0837; B29C 47/1036; B29C 47/1045; B29C 47/128; B29C 47/145

USPC ......................................................... 425/114
See application file for complete search history.

(56) References Cited

U.S. PATENT DOCUMENTS 3,112,527 A * 12/1963 Pankratz ............. B29C 67/2235
200/1 R
3,752,614 A * 8/1973 Bremer .................. B29C 47/28
425/113
(Continued)

FOREIGN PATENT DOCUMENTS

EP 0904959 A2 3/1999
EP 1211058 A1 6/2002
(Continued)

OTHER PUBLICATIONS

European Search Report dated Feb. 5, 2016 for Application Serial No. EP15181494.

*Primary Examiner* — James Mackey
(74) *Attorney, Agent, or Firm* — June E. Rickey

(57) ABSTRACT

A cross-head die assembly for use with an extruder is described. The cross-head die assembly includes: an inlet section having an inlet for communicating flow from the extruder to one or more flow channels formed in a support block; and an outlet, a removably mounted die located at the outlet and in fluid communication with the one or more flow channels; said support block further comprising an interior slot extending from a first side of the support block to an outlet passageway; a removable cassette positioned in the interior slot, wherein the front end of the removable cassette is positioned to seal the outlet passageway of the slot so that the slot is isolated from the flow.

14 Claims, 23 Drawing Sheets

(51) Int. Cl.
  B29C 47/12  (2006.01)
  B29C 47/08  (2006.01)
  B29C 47/28  (2006.01)
  B29D 30/38  (2006.01)
  B29C 47/10  (2006.01)
  B29C 47/36  (2006.01)
  B29L 7/00  (2006.01)

(52) U.S. Cl.
  CPC ... *B29D 2030/381* (2013.01); *B29L 2007/007* (2013.01)

(56)  References Cited

U.S. PATENT DOCUMENTS

| | | | |
|---|---|---|---|
| 3,859,017 A * | 1/1975 | Meudec | B29C 47/02 425/113 |
| 3,888,713 A | 6/1975 | Alderfer | |
| 4,150,929 A | 4/1979 | Brandt | |
| 4,274,821 A | 6/1981 | Kiemer | |
| 4,525,131 A * | 6/1985 | Hauser, Jr. | B29C 47/0818 264/171.14 |
| 4,756,682 A * | 7/1988 | Blaise | B29C 47/0023 425/113 |
| 4,948,354 A | 8/1990 | Minaudo | |
| 5,259,746 A | 11/1993 | Minuado | |
| 5,804,222 A * | 9/1998 | Brown | B29C 47/28 425/113 |
| D423,422 S | 4/2000 | Seloover | |
| 6,050,801 A * | 4/2000 | Eckenberg | B29C 47/28 425/113 |
| D432,956 S | 10/2000 | Ricquet | |
| D451,441 S | 12/2001 | Weber | |
| D453,729 S | 2/2002 | Demagall | |
| 7,056,110 B2 | 6/2006 | Abdallah | |
| D559,767 S | 1/2008 | Graas | |
| D583,755 S | 12/2008 | Takahashi | |
| D599,276 S | 9/2009 | Fontaine | |
| D601,939 S | 10/2009 | Fontaine | |
| D609,161 S | 2/2010 | Fontaine | |
| D609,627 S | 2/2010 | Frappart | |
| D626,910 S | 11/2010 | Bott | |
| D634,699 S | 3/2011 | Fontaine | |
| D638,348 S | 5/2011 | Harvey | |
| D639,719 S | 6/2011 | Harvey | |
| D639,720 S | 6/2011 | Harvey | |
| D643,800 S | 8/2011 | Riswanda | |
| D644,593 S | 9/2011 | Fontaine | |
| D647,456 S | 10/2011 | Behr | |
| D648,668 S | 11/2011 | Kujime | |
| D650,322 S | 12/2011 | Takahashi | |
| D659,633 S | 5/2012 | Bindner | |
| D665,335 S | 8/2012 | Baumard | |
| D665,336 S | 8/2012 | Skurich | |
| D667,358 S | 9/2012 | Fontaine | |
| D668,598 S | 10/2012 | Hughes | |
| D679,241 S | 4/2013 | Fehl | |
| D689,430 S | 9/2013 | Fontaine | |
| D692,371 S | 10/2013 | Fontaine | |
| 8,585,949 B2 | 11/2013 | Ponta et al. | |
| D694,702 S | 12/2013 | Leconte | |
| D728,453 S | 5/2015 | Maxwell | |
| D730,269 S | 5/2015 | Maxwell | |
| 9,120,262 B2 | 9/2015 | Ponta et al. | |
| 2010/0297277 A1 | 11/2010 | Fischer | |

FOREIGN PATENT DOCUMENTS

JP   56-154532     11/1981
JP   2005246736 A   9/2005

* cited by examiner

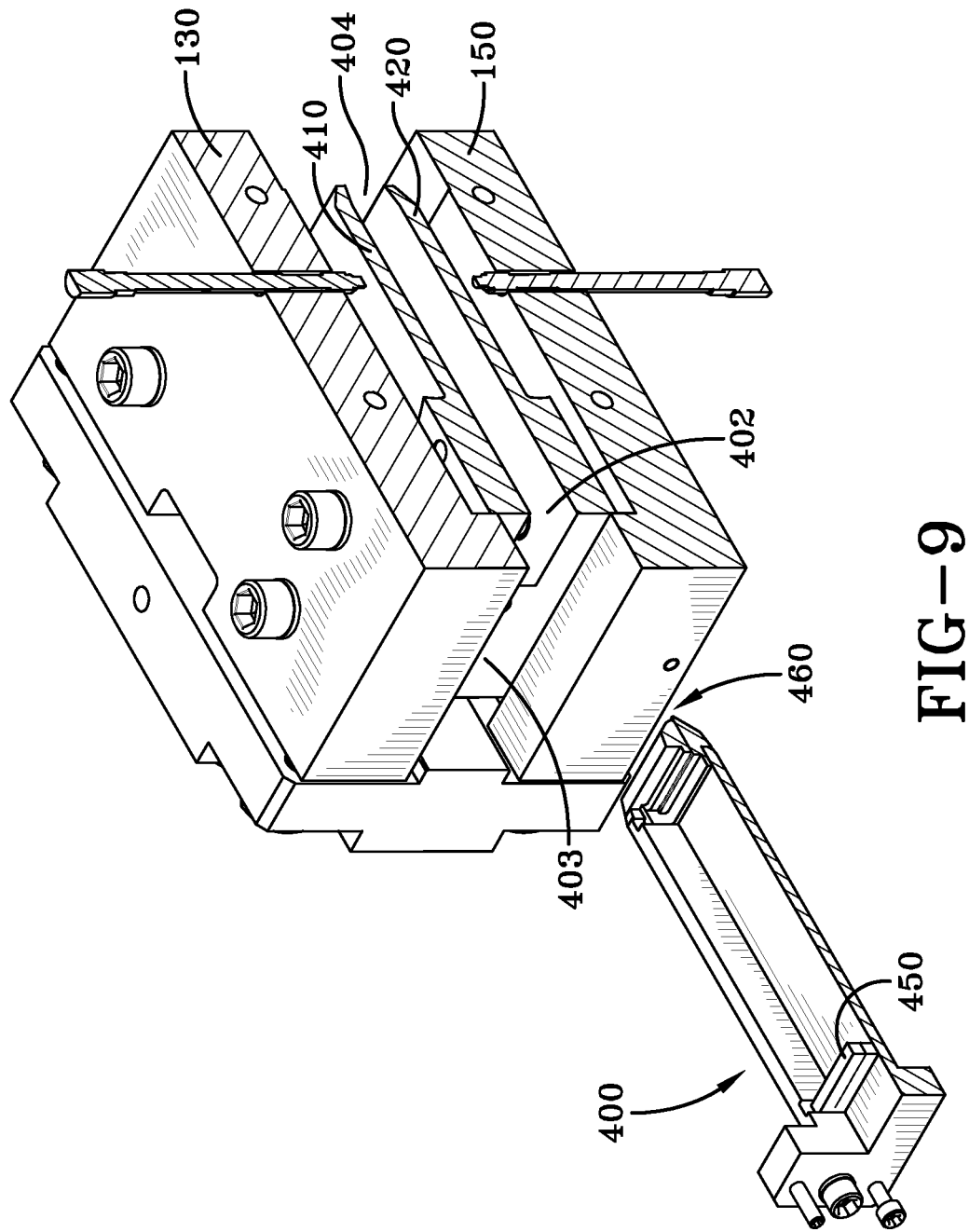

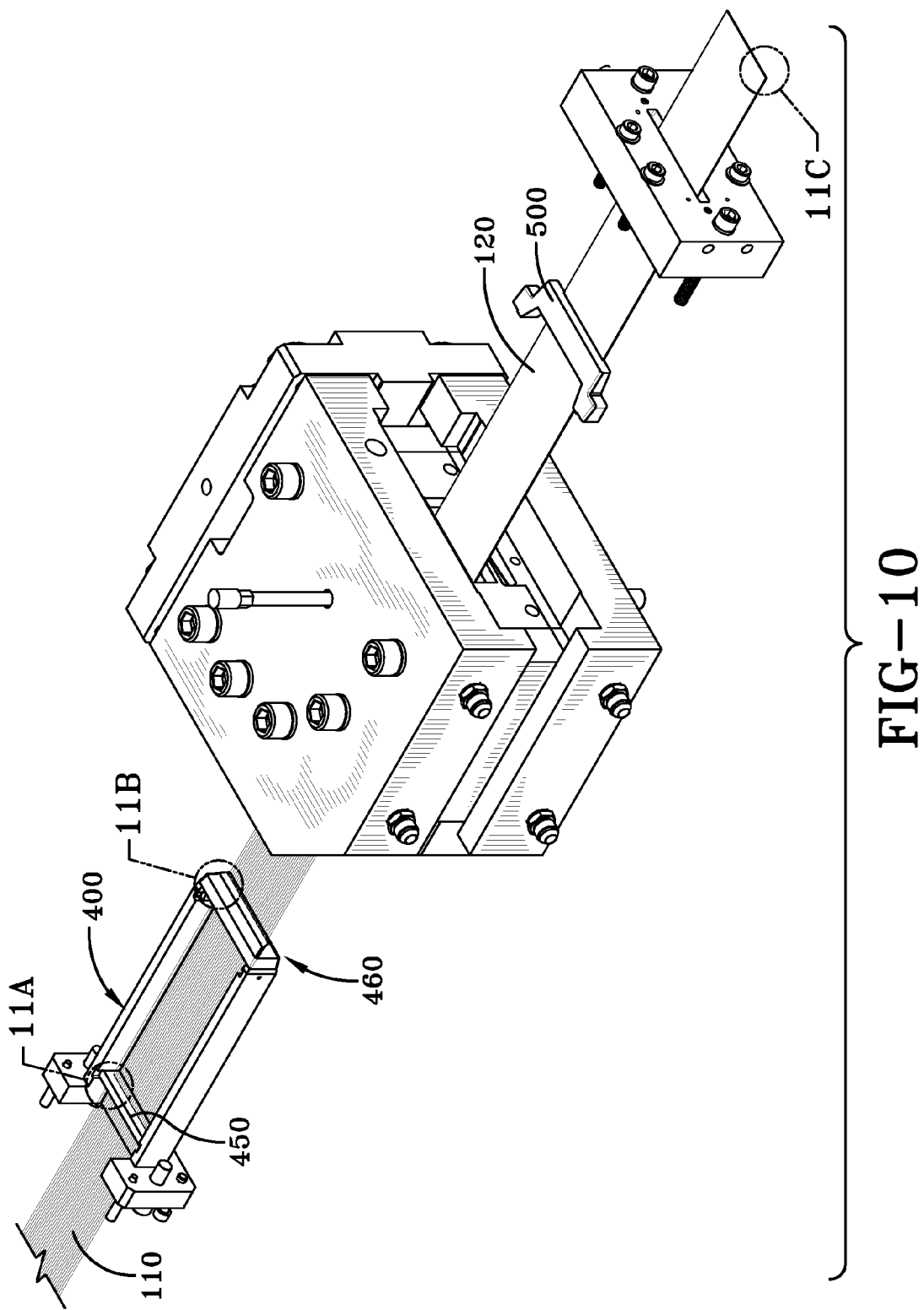

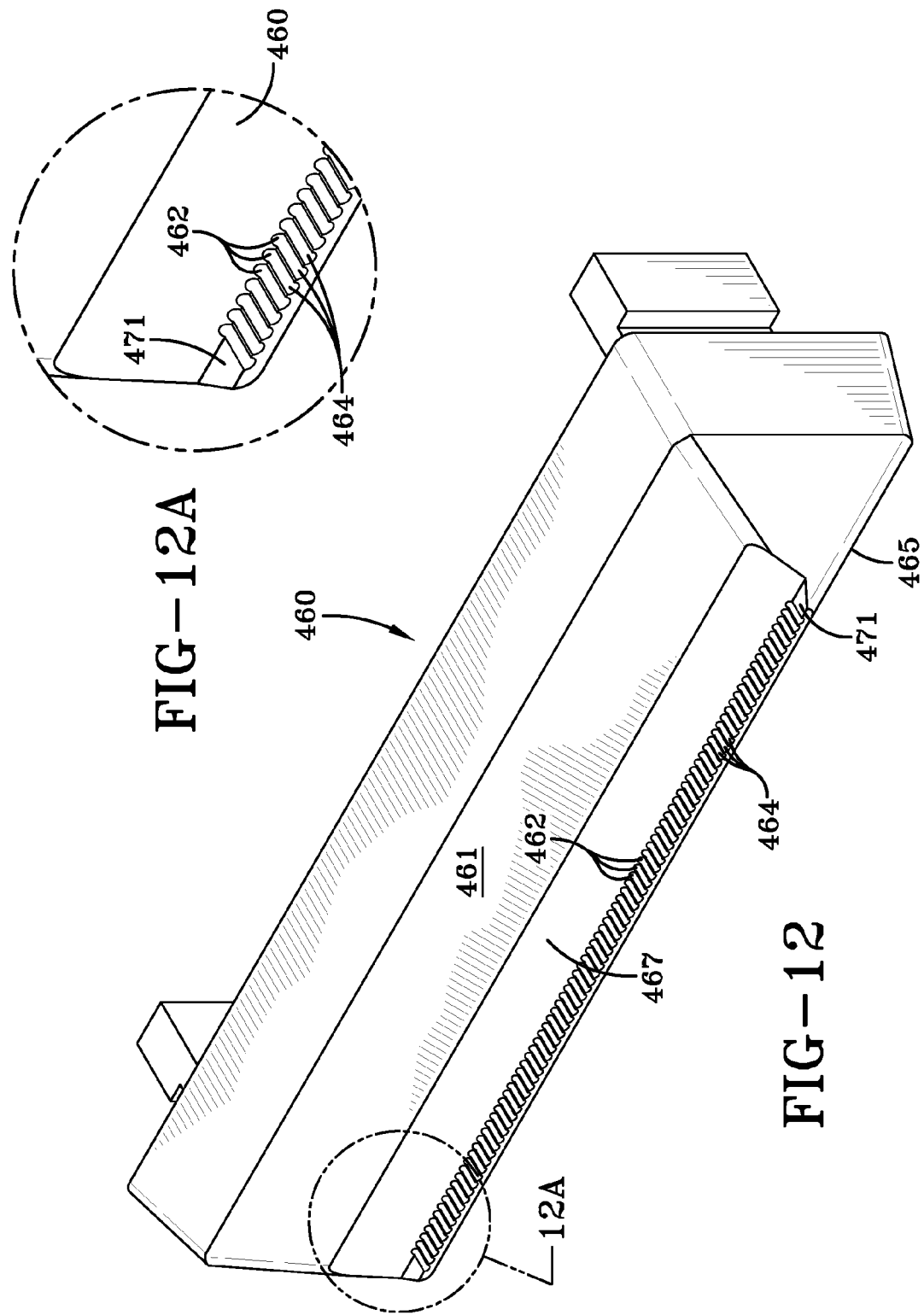

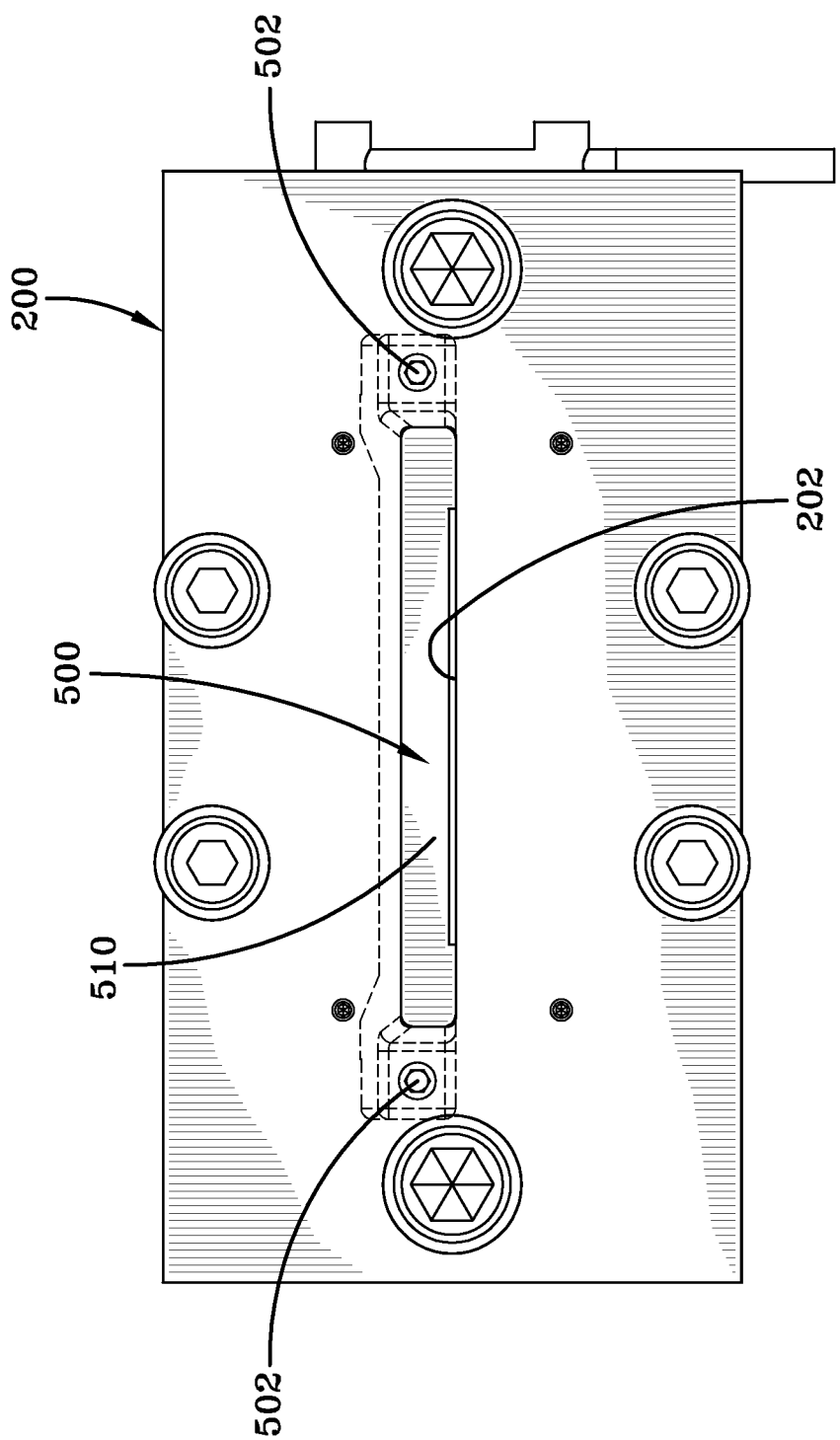

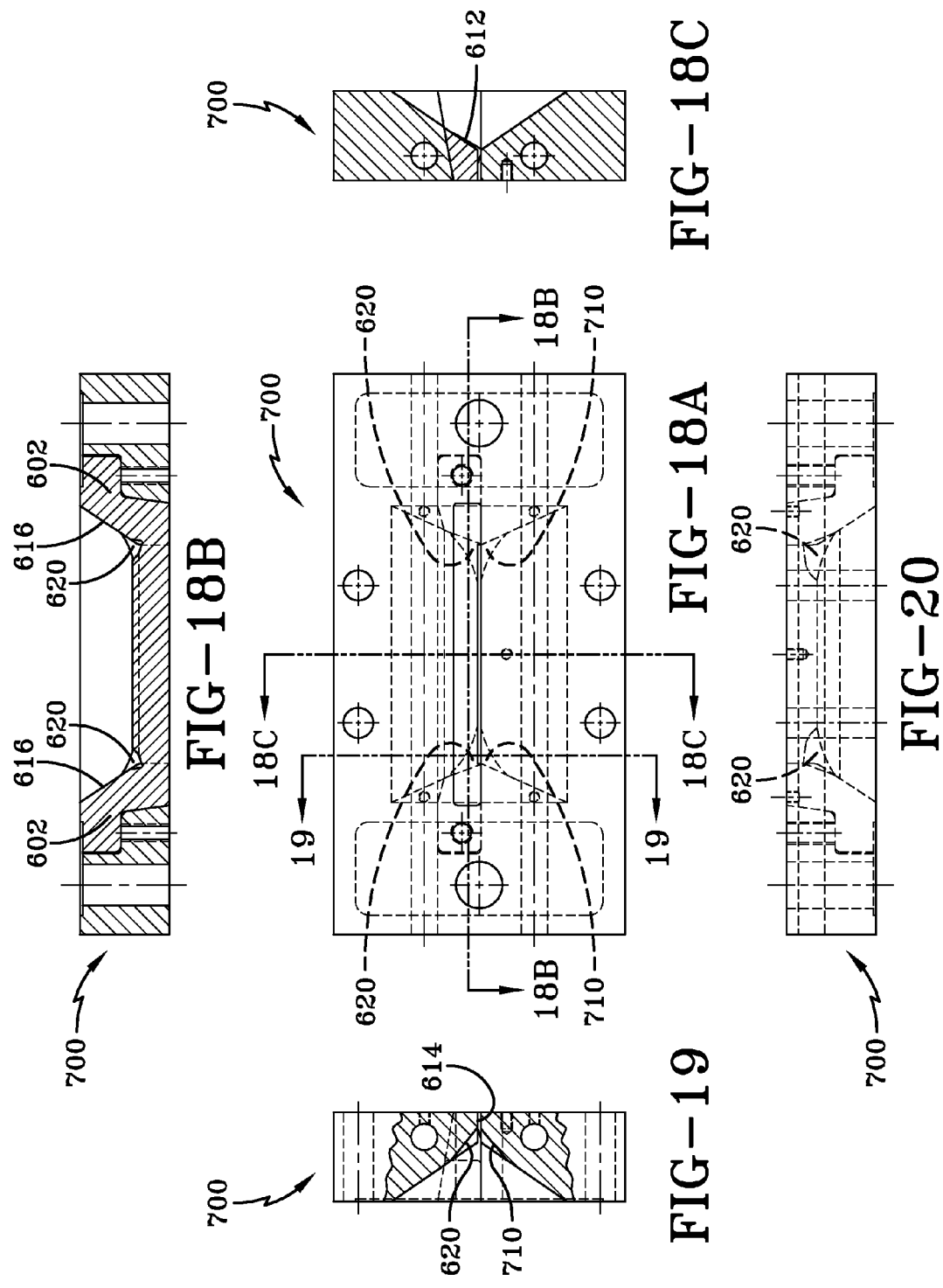

APPARATUS FOR PRODUCING LAMINATED FABRIC PLY STRIPS

FIELD OF THE INVENTION

This invention relates to pneumatic tires, and more particularly, the invention relates to ply constructions for tires.

BACKGROUND OF THE INVENTION

Modern passenger tires are typically constructed utilizing two or more layers of ply or a fabric woven from reinforcement filaments or cords. Such ply materials are typically made from an apparatus having a guide insert having passages through which the cabled reinforcement cords pass. If one of the reinforcement cords breaks, the apparatus typically needs to be disassembled, the guide insert removed, and then individually rethreading of the cords in the insert needs to occur. This procedure results in a significant loss on productivity. In addition, cords near the edge of the die can experience more drag, resulting in more stretch and distortion. Thus, it is desired to have an improved apparatus that allows replacement of one or more cords without the disruption of the remaining cords, and in a short period of time in order to minimize loss of production. It is also desired to have an improved apparatus that reduces clogging at the corners of the die inlet, which can reduce the effective die width and result in a nonuniform strip.

SUMMARY OF THE INVENTION

The invention provides in a first aspect a cross-head die assembly for use with an extruder, the cross-head die assembly comprising: an inlet section having an inlet for receiving flow from the extruder; an upper support block removably connected to a first side of the interior section; and a lower block removably connected to a second side of the interior section; a first flow passage being located between the upper support block and the interior section and being in fluid communication with the inlet; a second flow passage being located between the interior section and the lower support block and being in fluid communication with the inlet; said cross-head die assembly further comprising a removably mounted die located at an outlet end of the assembly, said first and second flow passage being in fluid communication with an inlet of the die; said interior section further comprising an interior slot which extends from a first side of the assembly to the inlet of the die; and a removable cassette positioned in the interior slot.

The invention provides in a second aspect a cross-head die assembly for use with an extruder, the cross-head die assembly comprising: an inlet section having an inlet for communicating flow from the extruder to one or more flow channels formed in a support block; and an outlet, a removably mounted die located at the outlet and in fluid communication with the one or more flow channels; said support block further comprising an interior slot extending from a first side of the support block to an outlet passageway; a removable cassette positioned in the interior slot, wherein the front end of the removable cassette is positioned to seal the outlet passageway of the slot so that the slot is isolated from the flow.

The invention provides in a third aspect a cross-head die assembly for use with an extruder, the cross-head die assembly comprising: an inlet section having an inlet for communicating flow from the extruder to one or more flow channels formed in a support block; and an outlet, a removably mounted die located at the outlet and in fluid communication with the one or more flow channels; said support block further comprising an interior slot extending from a first side of the support block to an outlet passageway; a removable cassette positioned in the interior slot, wherein the front end of the removable cassette is positioned to seal the outlet passageway of the slot so that the slot is isolated from the flow.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel reinforcement cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF DRAWINGS

In the accompanying drawings:

FIG. 9 is a cross-sectional view of the cross head die assembly of FIG. 8 in the direction 9-9.

FIG. 10 is a perspective view of the cross head die assembly of FIG. 1 showing the cords path through the cord cassette, and the cord guide and upper and lower dies.

FIG. 12 is a perspective view of the nose of the cassette, and FIG. 12A is a close-up view of the nose lip and cord outlet.

FIG. 13C is a front view of the die and insert assembly, assembled.

FIG. 18A is a front view of the die and insert assembly of FIG. 17.

FIG. 18B is a cross-sectional view of the die and insert assembly of FIG. 18A in the direction 18A-18A.

FIG. 18C is a cross-sectional view of the die and insert assembly of FIG. 18A in the direction 18C-18C.

FIG. 19 is a cross-sectional view of the die and insert assembly of FIG. 18A in the direction 19-19.

FIG. 20 is a top view of the die and insert assembly of FIG. 18A.

DESCRIPTION OF THE PREFERRED EMBODIMENT(S)

Figure 1:
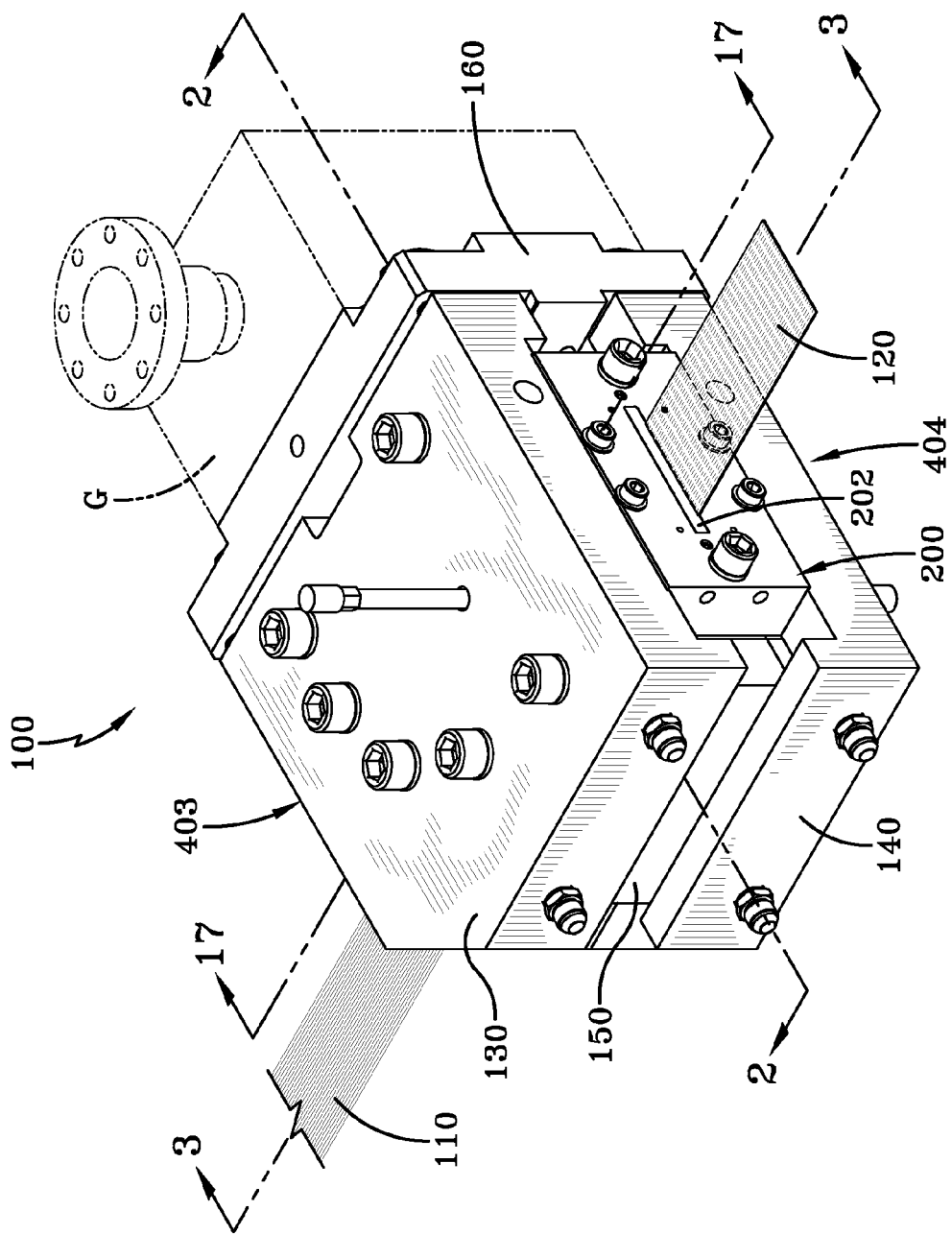
FIG. 1 is a perspective view of a cross-head die assembly shown with gear pump assembly in phantom.

FIG. 1 illustrates a cross-head die assembly 100 connected to an extruder assembly G shown in phantom. The assembly G may include a gear pump and extruder combination, or an extruder. The assembly G supplies the elastomeric material to the cross-head die assembly. As shown in FIG. 1, a plurality of parallel reinforcement cords 110 enter the cross-head die assembly 100 and are encased with elastomeric material to form a strip of reinforced ply material 120 which is output from the outlet passageway 202 of the die 200. The strip has a typical width of 80 mm with a thickness of 1.2 mm.

The cross-head die assembly 100 has an upper support block 130, a lower support block 140 and an interior section 150. An inlet section 160 is located on one end of the cross-head die assembly and is connected to the upper support block 130, the lower support block 140 and the interior section 150. The upper support block 130, lower support block 140 and the interior section are all removably connected to the assembly 100.

Figure 2:
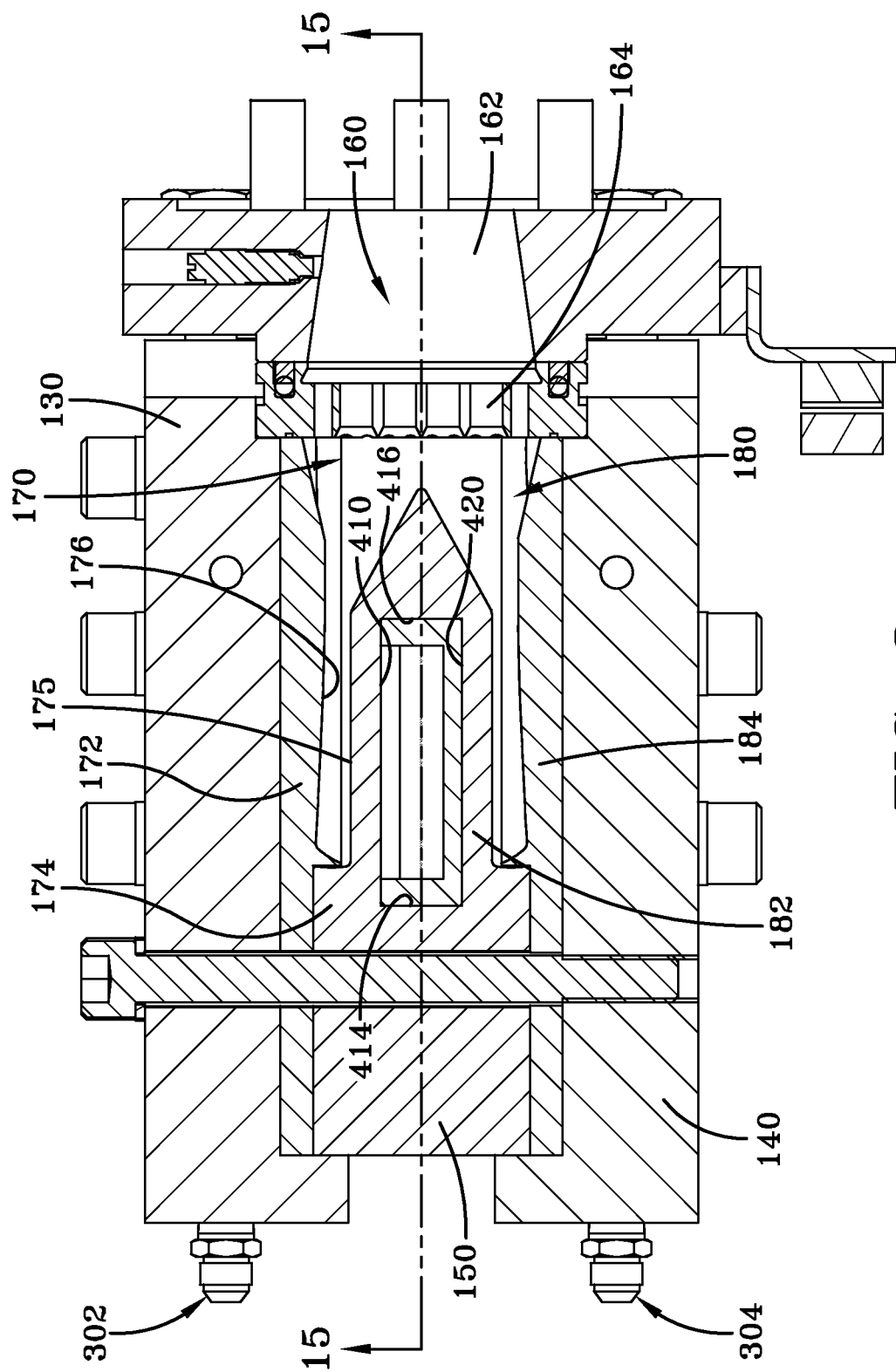
FIG. 2 is a cross-sectional view of the cross-head die assembly of FIG. 1 in the direction 2-2.
Figure 14:
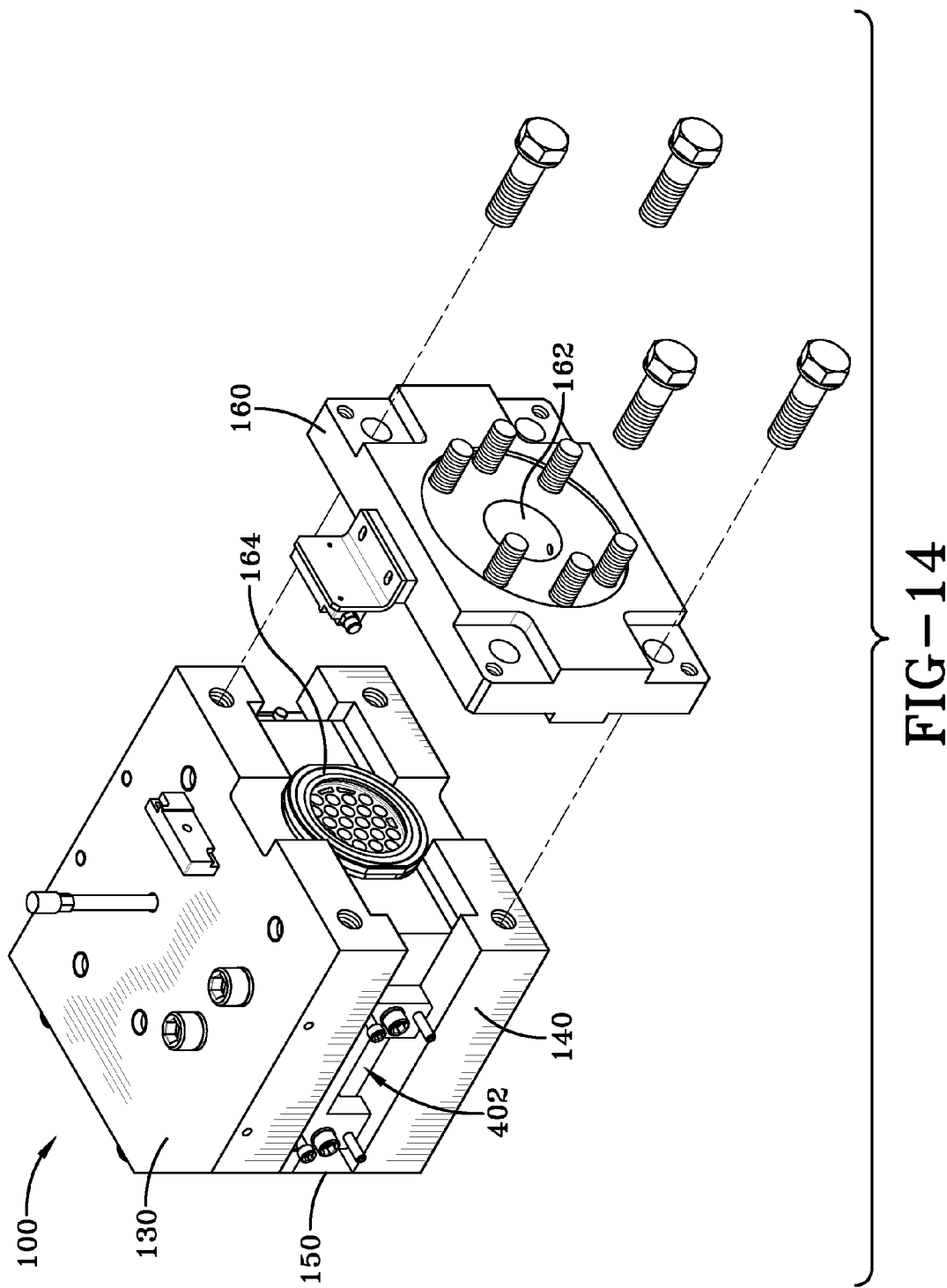
FIG. 14 is a side view of the cross-head die assembly shown with the block removed for accessing the filter.

A cross-section of the cross-head die assembly 100 is shown in FIG. 2. The inlet section 160 has an inlet channel 162 for receiving elastomer material from an extruder (not shown) or extruder-gear pump assembly G. The inlet channel 162 communicates elastomer flow to a screen filter 164. As shown in FIG. 14, the inlet section 160 is easily removed from the assembly 100 without the need to completely disassemble the die assembly in order to replace or access the screen filter 164. The screen filter 164 is easily removed and replaced.

Figure 5:
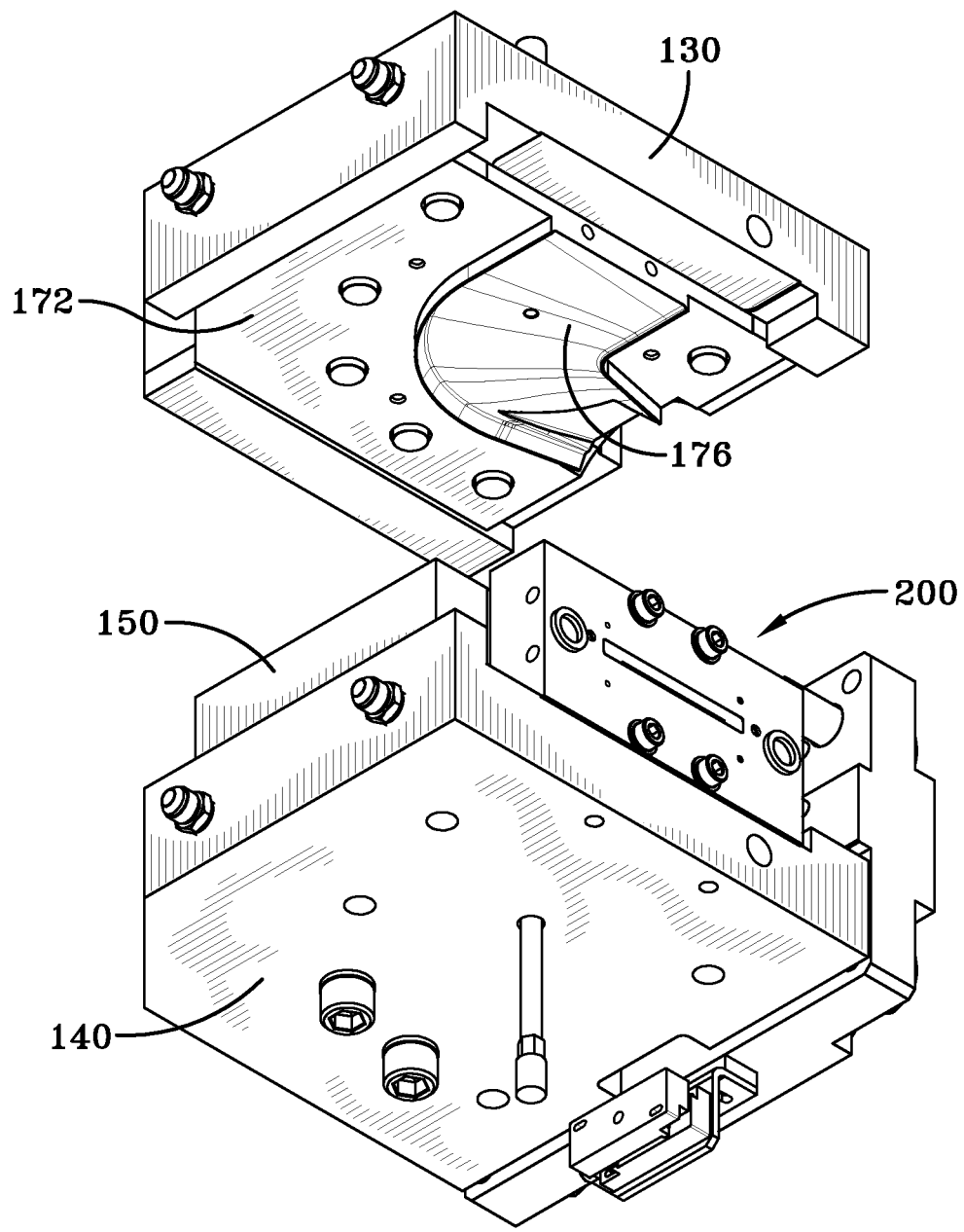
FIG. 5 is a perspective, partially exploded view of the cross head die assembly of FIG. 1 showing the upper flow channel upper insert.
Figure 6:
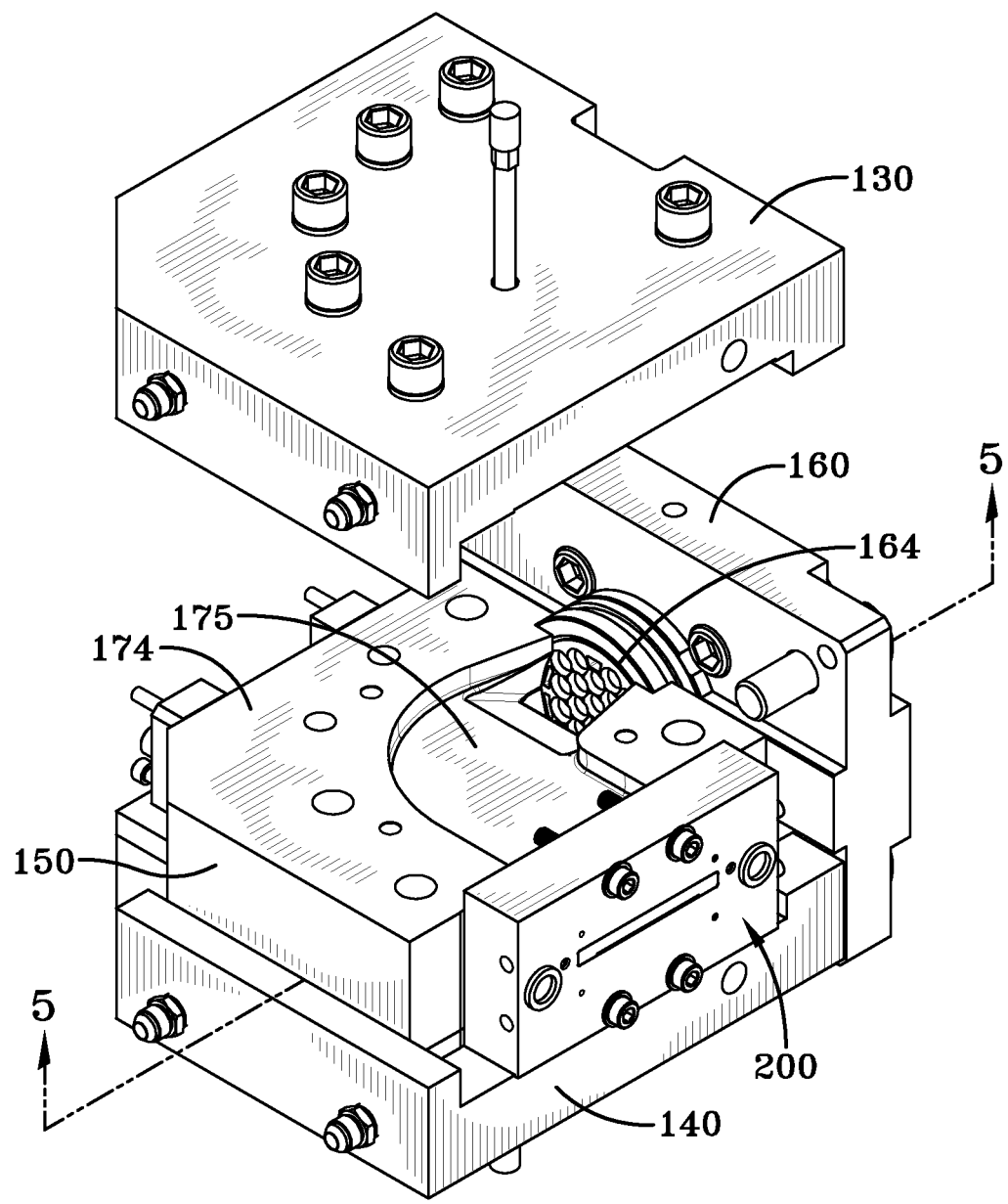
FIG. 6 is a perspective, partially exploded view of the cross head die assembly of FIG. 1 showing the upper flow channel lower insert.
Figure 7:
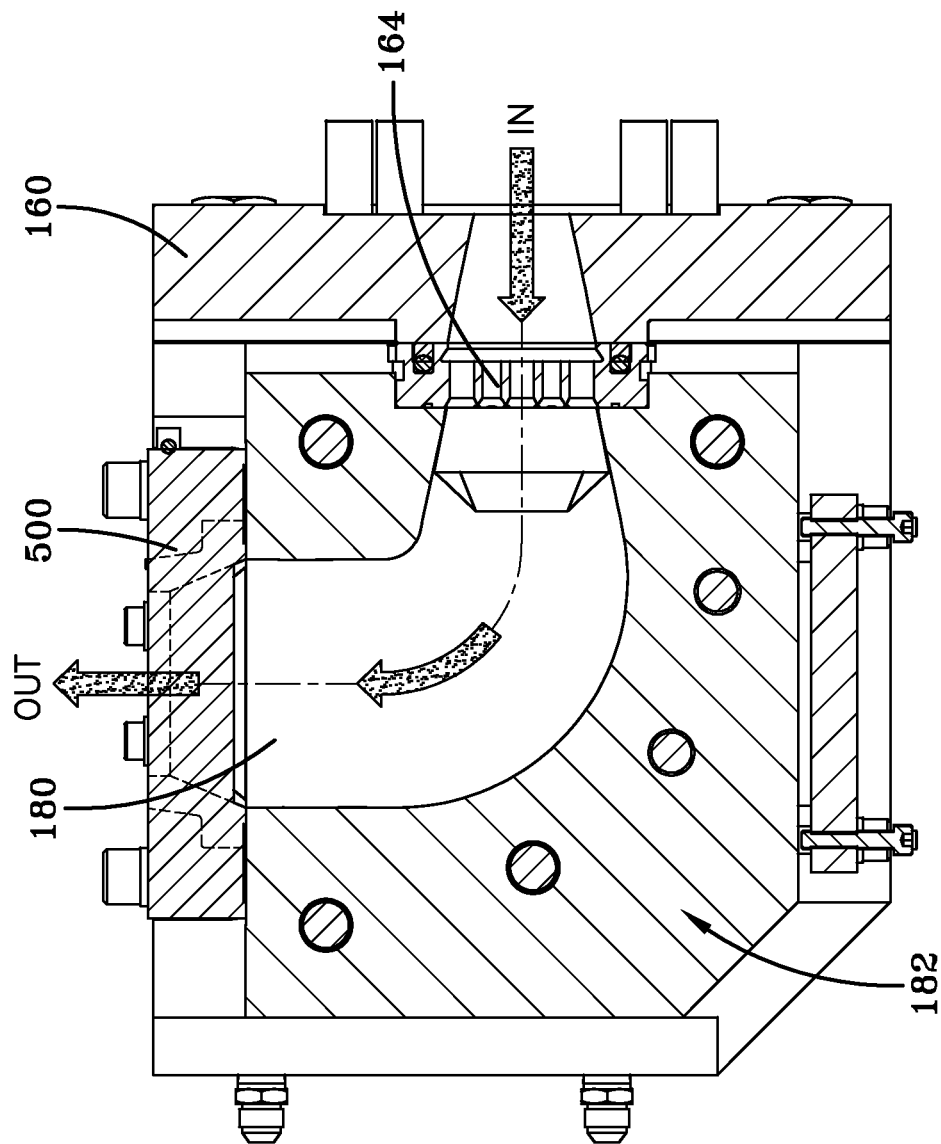
FIG. 7 is a perspective view of the cross head die assembly of FIG. 1 showing the lower flow channel upper insert.

As shown in FIG. 2, elastomer flow from the extruder enters the assembly 100 and is separated into an upper flow channel 170 and a lower flow channel 180. The upper flow channel 170 is formed from a removable upper insert plate 172 and a removable lower insert plate 174. The removable upper insert plate 172 (FIG. 5) has a 90 degree flow path 176 that cooperates with the 90 degree flow path 178 (FIG. 6) of the lower insert plate 174 to form the upper flow channel 170. Likewise, the lower flow channel 180 is formed between a removable upper insert plate 182 (FIG. 7) and a lower insert plate 184 with 90 degree flow paths that cooperate to form the lower flow channel 180. Preferably, the lower insert plate 174 and the upper insert plate 182 have a tapered outlet end 173, 183. The elastomer flow from the upper and lower flow channel 170, 180 enters the profile die 200. The profile die 200 is removably mounted to the cross-head assembly 100. As shown in FIG. 1, the profile die 200 has an outlet hole 202 for exit of the ply strip from the assembly 100.

Figure 8:
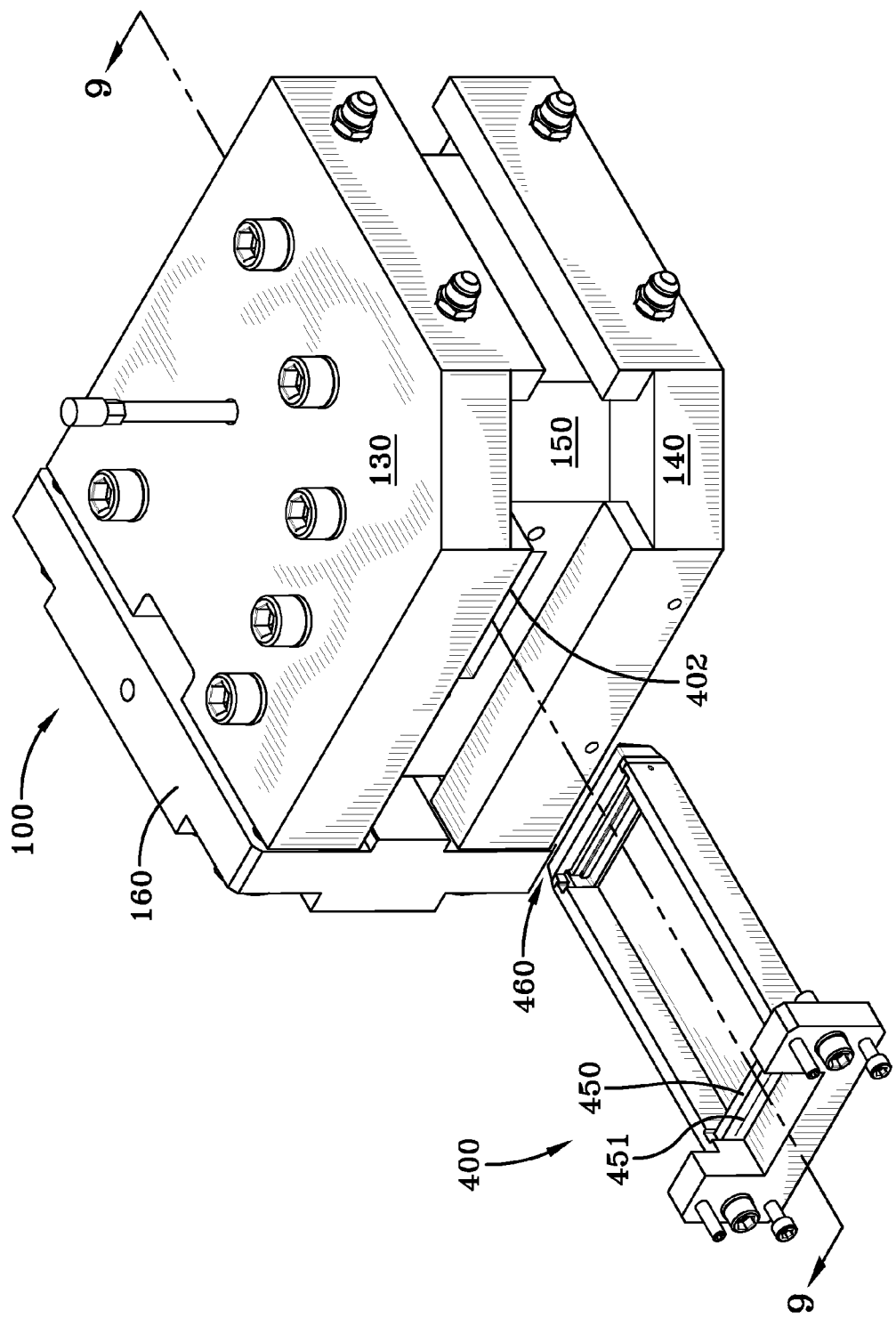
FIG. 8 is a rear view of the cross head die assembly of FIG. 1 showing the cord cassette removed.
Figure 11A:
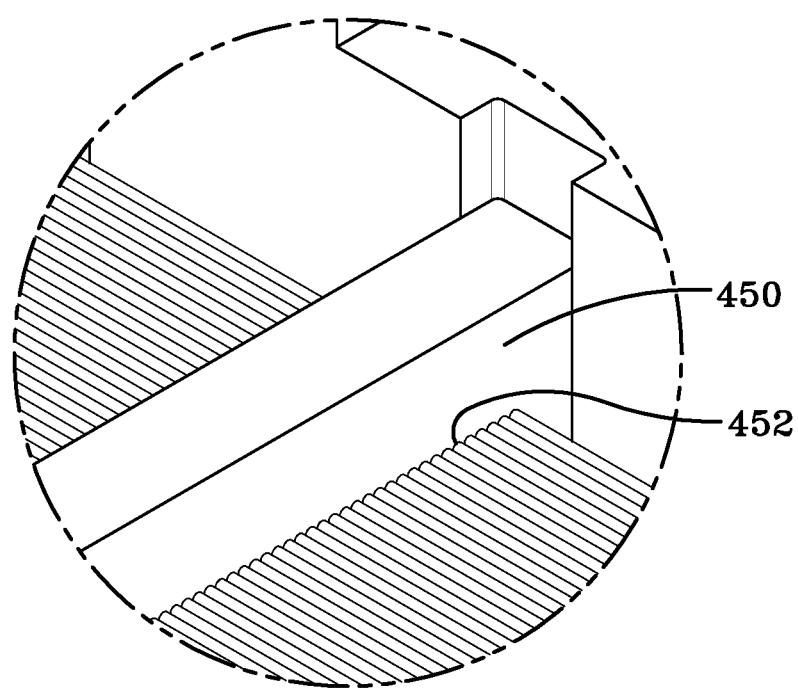
FIGS. 11A, 11B, and 11C are close up views of the respective circled portions shown in FIG. 10.
Figure 11B:
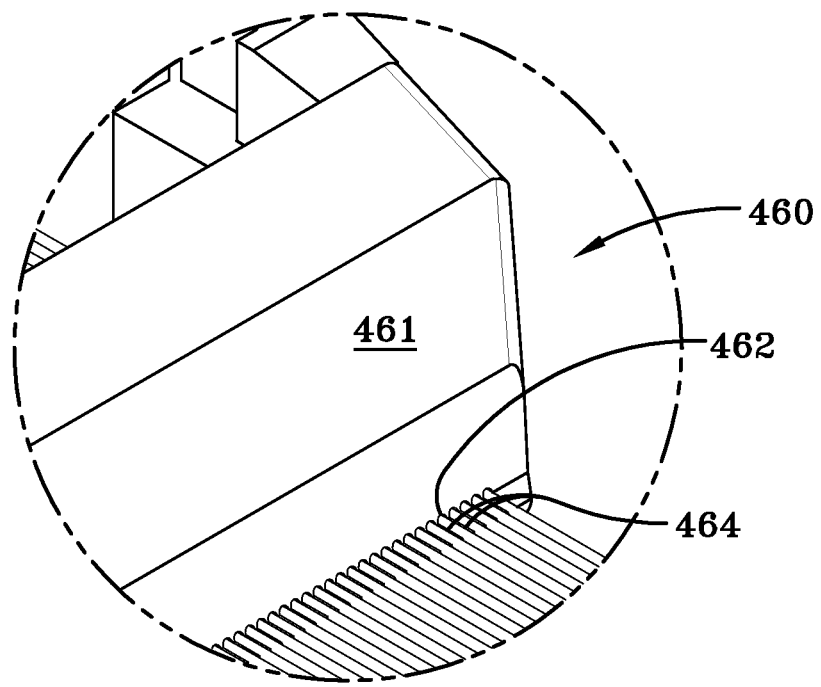
Figure 11C:
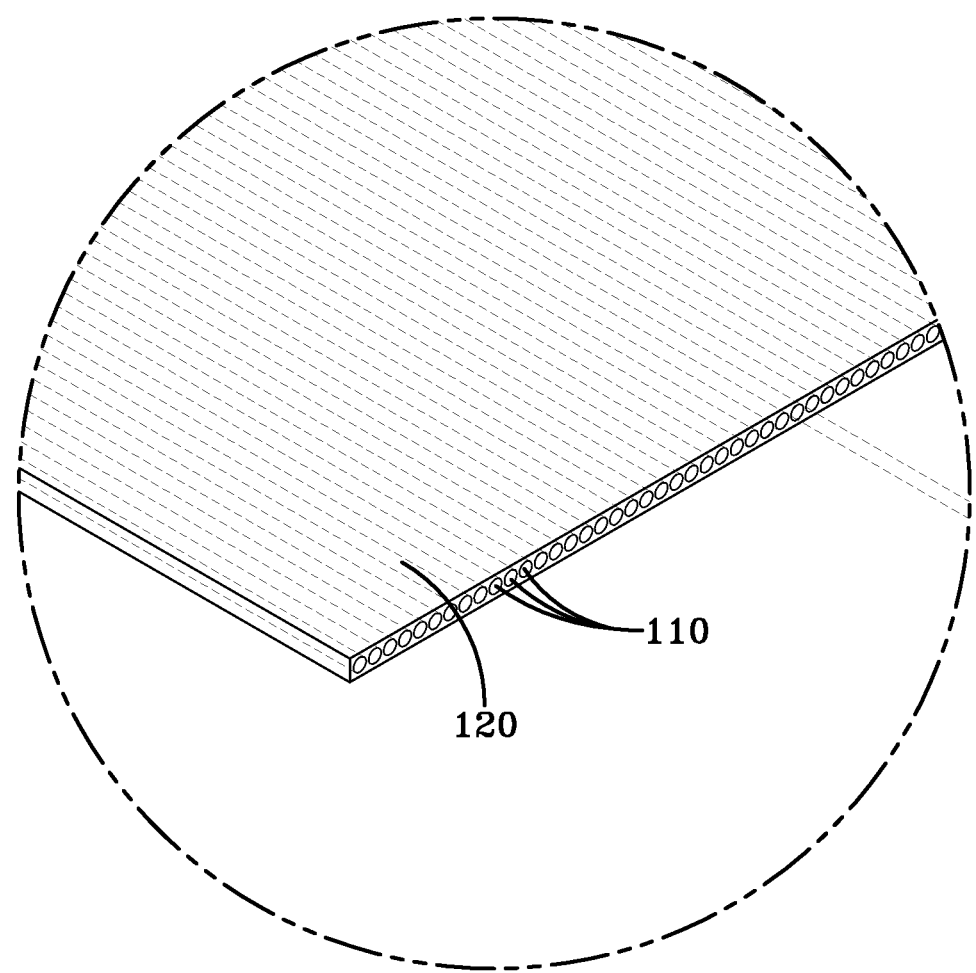
Figure 13A:
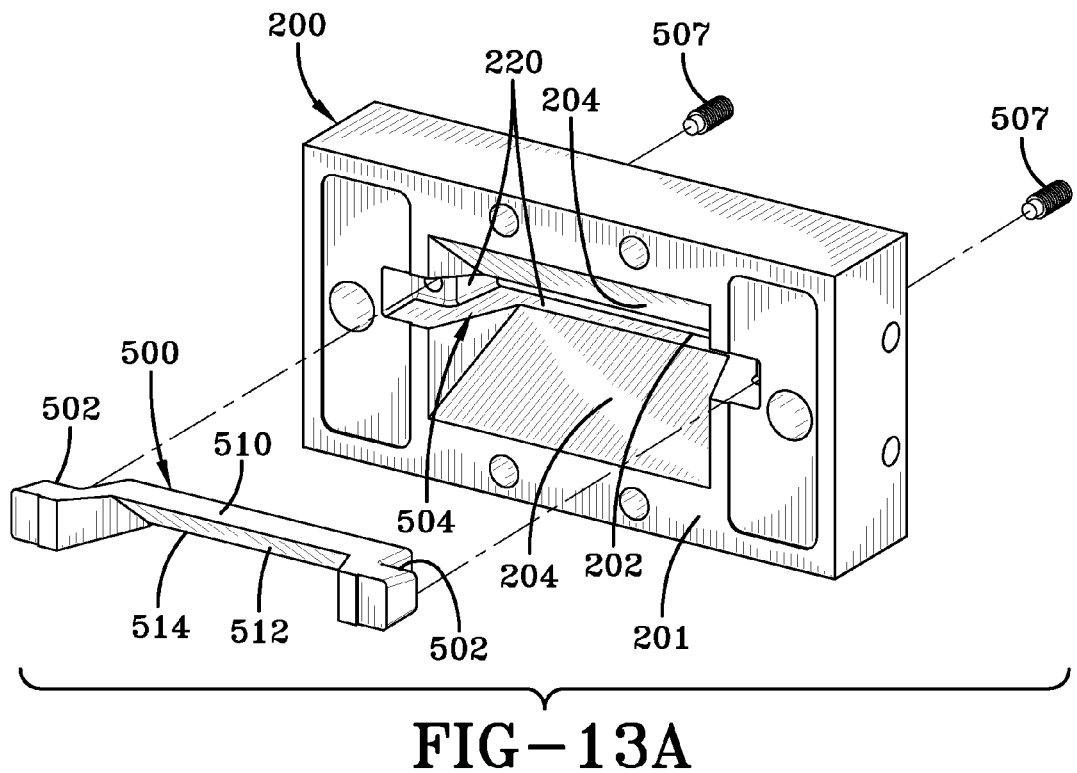
FIG. 13A is a rear perspective view of the die and insert assembly, unassembled.
Figure 13B:
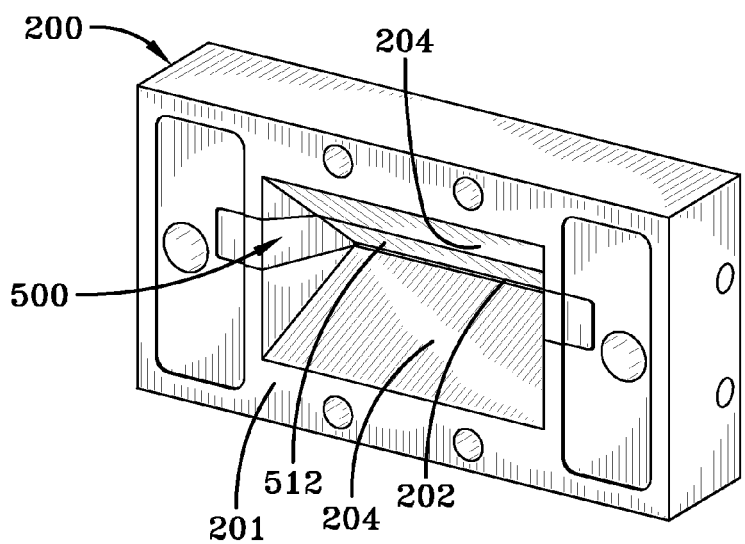
FIG. 13B is a rear perspective view of the die and insert assembly, assembled.
Figure 15:
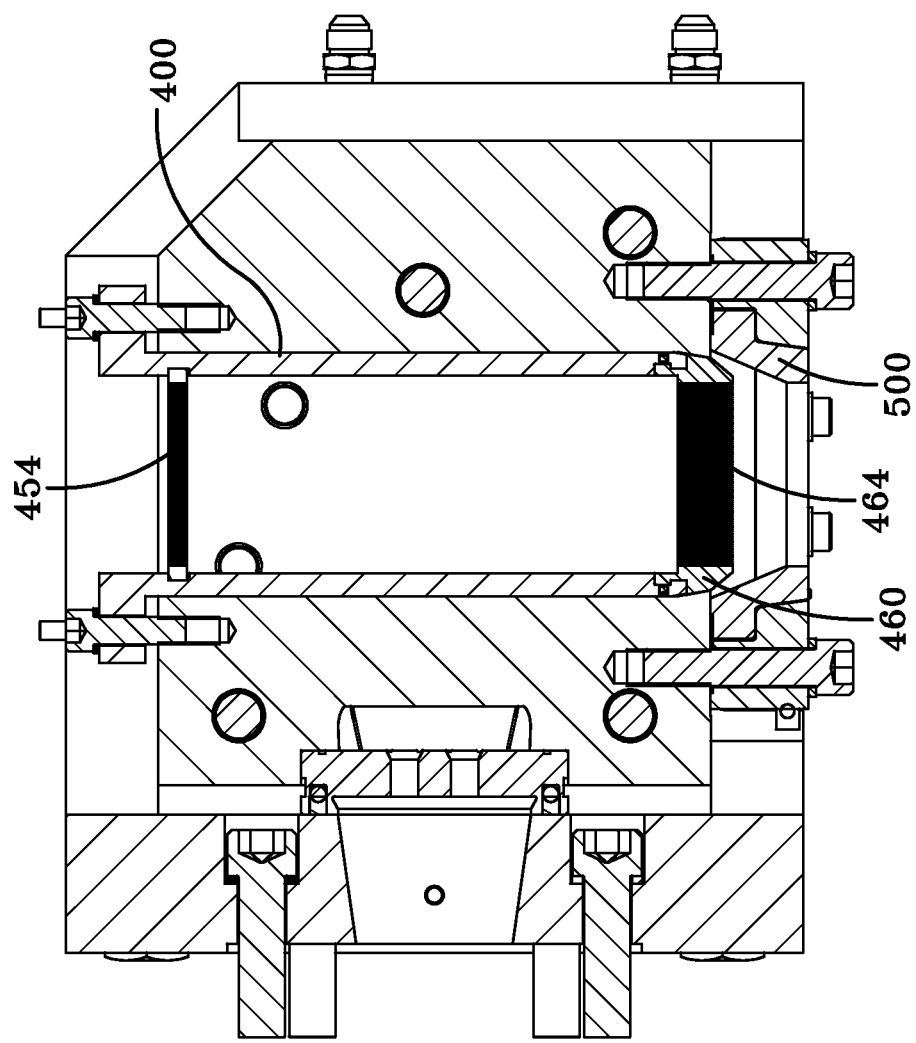
FIG. 15 is a cross-sectional view of the cross-head die assembly of FIG. 2 in the direction 15-15.
Figure 16:
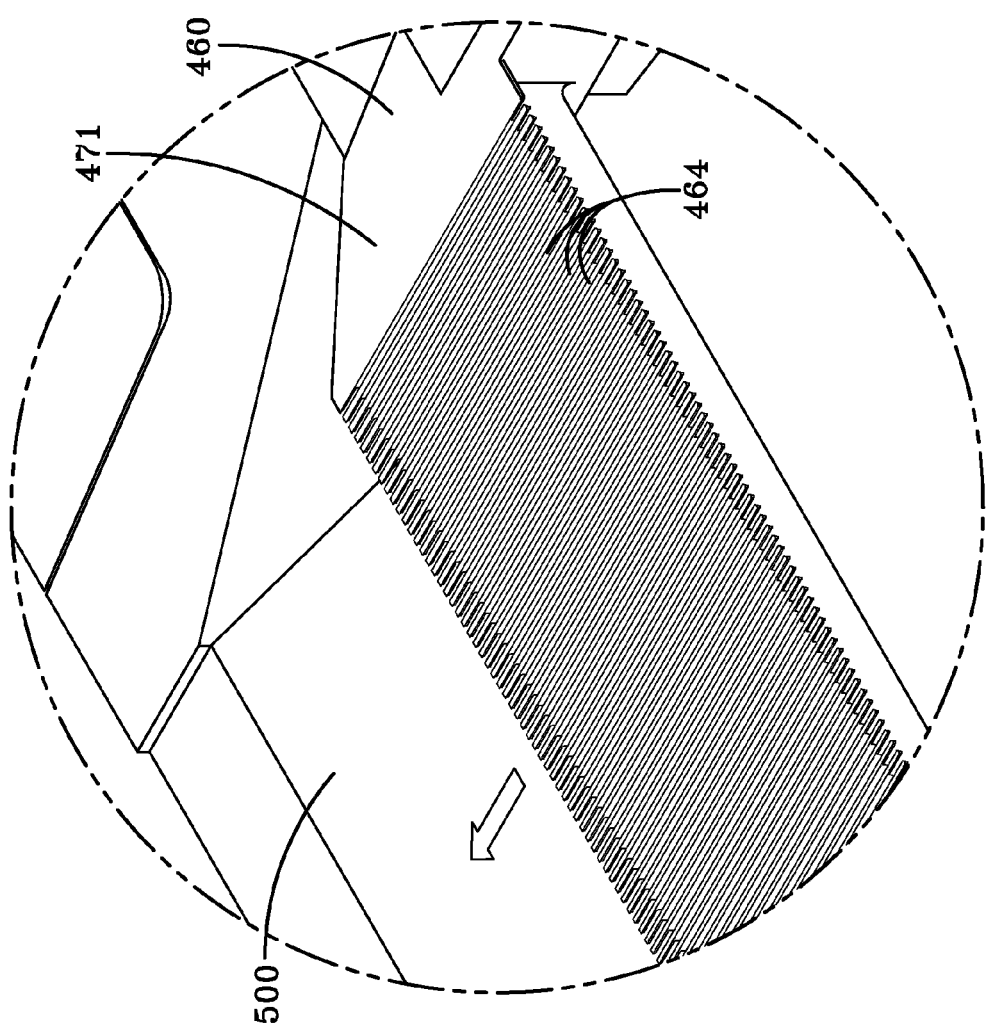
FIG. 16 is a close-up view of the lip of the nose of the cassette, showing the cord alignment grooves.

As shown in FIG. 8, the cross-head die assembly 100 has a removable cassette 400 for feeding the reinforcement cords 110 into the cross-head die assembly in parallel alignment. The cassette 400 is received in a rectangular shaped slot 402 located in interior section 150. As shown in FIG. 9, the rectangular slot 402 extends from the inlet side 402 of the cross-head die assembly to the outlet side 404. The slot 402 is separated and isolated from the elastomer flow in the upper and lower flow channels 170, 180. The slot has upper and lower walls 410, 412 and first and second sidewalls 414, 416 which isolates the cassette and therefore allows the cassette to be removed from the assembly without disruption of the elastomer flow. FIG. 10 illustrates the cords 110 in the cassette 400. The cords 110 are threaded in the slot 451 of cord guide 450 as shown in FIG. 11A, wherein the slot has inner surfaces 452 having alignment edges 454 (FIG. 15) which maintain the spacing of the cords. The front end of the cassette has a nose 460 as shown in FIGS. 8, 12 and 12a. The nose 460 is detachable from the cassette. The nose 460 has a row of closely spaced outlet holes 462, wherein each hole 462 receives a cord. The outlet holes 462 are positioned adjacent a lip 471 which protrudes axially from the outer surface of the nose. The lip 471 is formed by the removal or relief of a portion of the upper surface of the nose. A plurality of alignment groove 464 are positioned on the lip 471 adjacent each outlet hole 462. The alignment groove 464 extends through the hole as shown in FIGS. 12, 13 and 16. The alignment grooves 464 together with the outlet holes 462 maintain the proper separation, spacing and alignment of each individual cord so that the reinforcement ply strip is formed with parallel and properly spaced cords as shown in FIG. 11C. Further, the individual holes for each cord allow for the easy replacement of a single broken cord without disrupting the remaining cords.

Figure 4:
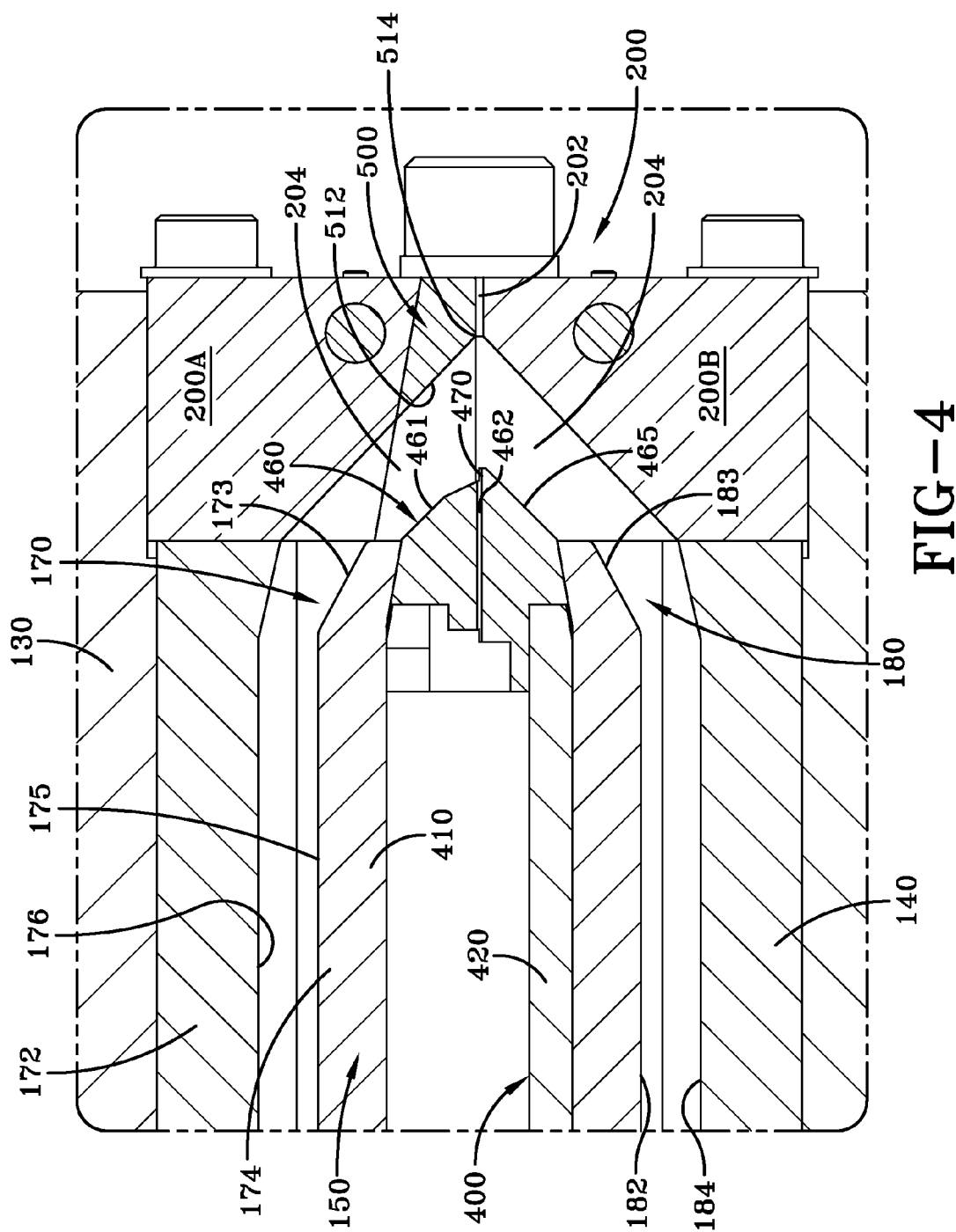
FIG. 4 is a cross-sectional view of the cross head die assembly of FIG. 1 in the direction 4-4.

The nose 460 of the cassette is positioned adjacent the die assembly 200. As shown in FIGS. 4 and 13, the rear face 201 of the die 200 has angled passageways 204 for communicating elastomer through the die outlet hole 202. The die assembly 200 further includes an insert 500 which is removably mounted in a slot 504 the die assembly 200. The insert has flanged ends 502 which are positioned in the slot ends 506. Fasteners 507 are jacking screws to assist in pressing the insert out of the die assembly for cord change. The insert 500 has a front sealing edge 510 that is positioned in the insert slot 504. The insert 500 functions to seal the die edges to prevent leakage, particularly near the edges of the die. As pressure increases in the die assembly, the insert is pushed further into the die, resulting in the insert sealing edge 510 forming a seal with the die edges 220 located around the outlet hole 202. The insert has a lower face 512 that forms part of the angled passageway 204 when the insert is snapped into the die. The lower portion 514 of the lower face 512 forms the upper portion of the die outlet hole 202.

The nose 460 of the cassette has an upper and lower outer contoured surface 461, 465. The upper contoured surface 461 of the nose is positioned adjacent the angled passageway 204. As the elastomer flows from the upper and lower channel, it is squeezed through the angled passageway 204 and along the outer contoured surface 461,465 of the nose 460. The elastomer flows down the upper outer surface of the nose, and then meets the cords at the lip 471 and encapsulates the reinforcement cords 110 along the lip 471. The alignment grooves 464 of the lip 471 maintain stability by retaining the cord spacing and alignment while the elastomer flows onto the cords. The flow from the bottom channel flows along the bottom surface of the nose and meets the cord after the upper portion of the cords have already been coated with rubber. The elastomer and cords then pass through the angled passageway 204 and then through the die outlet hole 202.

The die 200 is removable to allow for easier cord threading. If a cord breaks or the cords need to be changed out, the cassette can be easily removed from the assembly. The die 200 and insert 500 can also be removed for cord change. If a cord is broken, it can be rethreaded into the guide 450 and the outlet hole 462 of the cassette. A broken cord can be replaced without rethreading the remaining cords. When the cassette is removed, the rubber or elastomer remains isolated in the flow channels. A complete change out of the cord package may occur within 5 minutes. The flow channel inserts may also be changed out.

Figure 3:
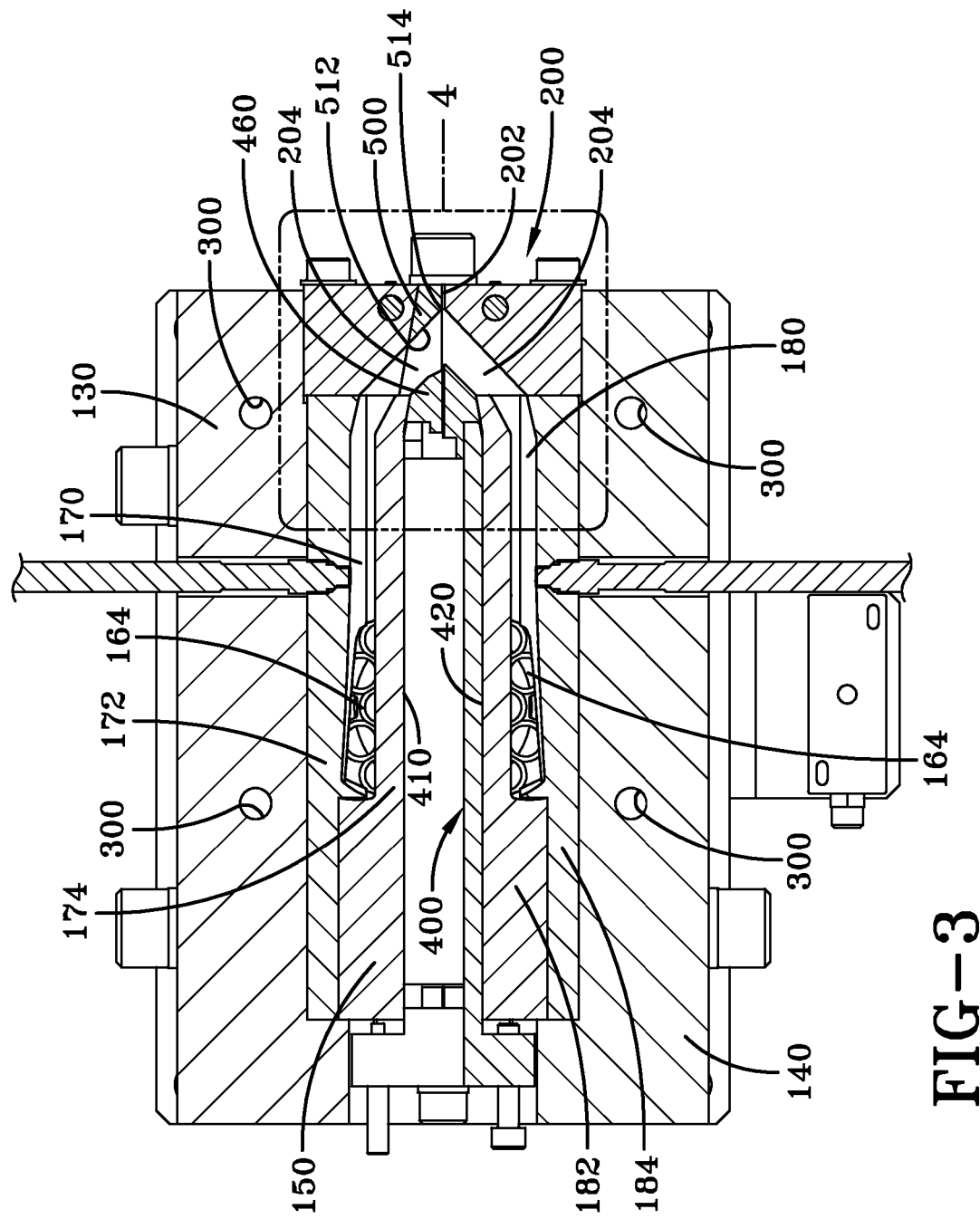
FIG. 3 is a cross-sectional view of the cross head die assembly of FIG. 1 in the direction 3-3.

As shown in FIGS. 2,3, the cross-head die assembly 100 may further comprise one or more cooling/heating channels 300 with a coolant inlet 302 and coolant exit 304.

Figure 17:
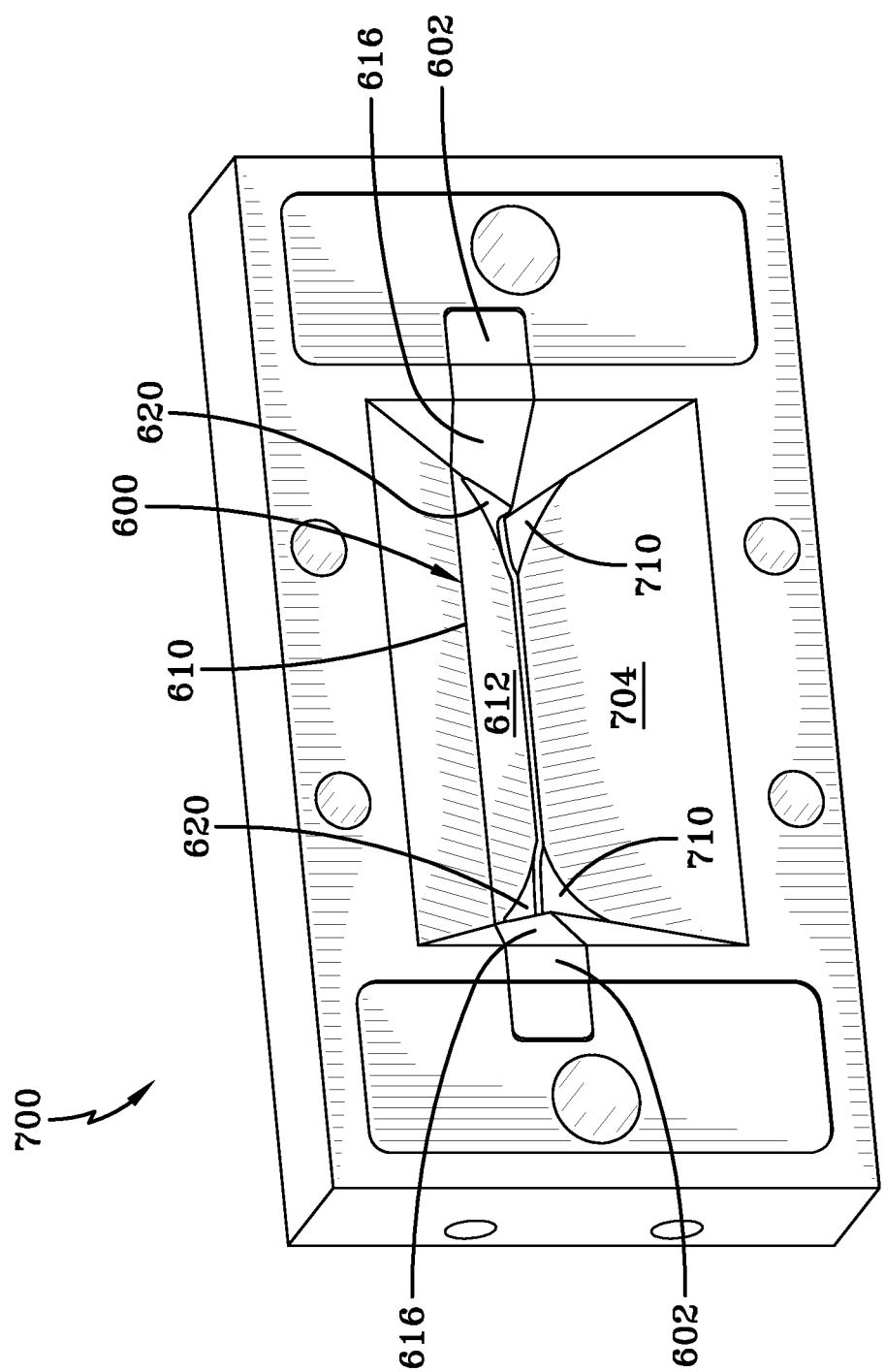
FIG. 17 is a front perspective view of a second embodiment of a die and insert assembly.

An alternate embodiment die insert 600 in shown in FIG. 17. The insert 600 can be removably inserted in a slot 504 the die assembly 200. The insert 600 has flanged outer ends 602 which are positioned in the slot ends 506. As shown in FIG. 18, the insert 600 has a front sealing edge 610 that is positioned in the insert slot 504. The insert 600 functions to seal the die edges to prevent leakage, particularly near the edges of the die. As pressure increases in the die assembly, the insert is pushed further into the die, resulting in the insert sealing edge 610 forming a seal with the die edges 220 located around the outlet hole 202. The insert has a lower face 612 that forms part of the angled passageway 204 when the insert is snapped into the die. The lower portion 614 of the lower face 612 forms the upper portion of the die outlet hole 202. The outer ends 602 have an interior wing shaped portion 616 that is in the flow path of the rubber. The wing shaped portions 616 outwardly project and extend into the flow path. The die insert 600 further includes two edge flow channels 620 formed in the corner between the lower face 612 and the wing shaped portion 616 of the die outer end 602. Each edge flow channel 620 forms a V shaped slit between the wing shaped portion 616 and the lower face 612. The opening of the edge flow channel faces the die outlet. The angled passageway 704 adjacent each edge flow channel 620 has an internal chamfer in each corner 710. Thus the edge flow channels 620 together with the chamfered corners 710 increase the flow area at the outer corners of the die. This increased flow area increases the rubber flow and reduces drag.

Figure 21:
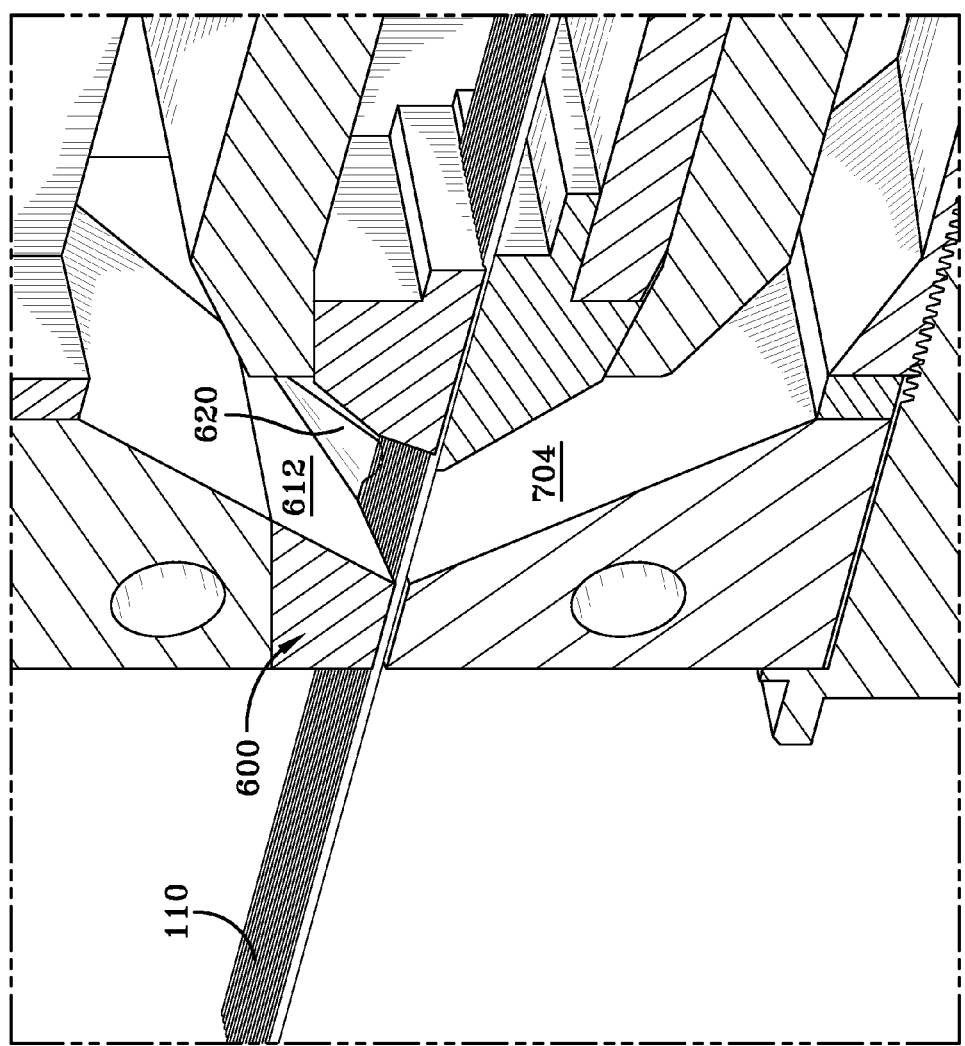
FIG. 21 is a cross-sectional view of the cross-head die assembly in the direction of the flow.
Figure 22:
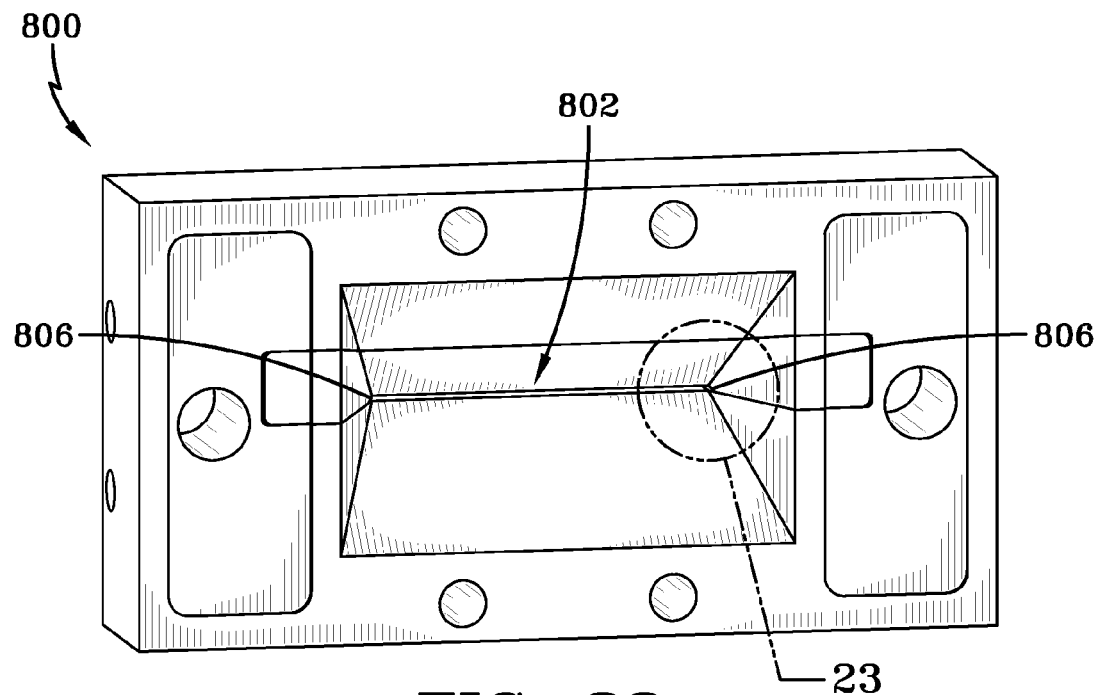
FIGS. 22-24 illustrate an alternate embodiment of a die and die insert.
Figure 23:
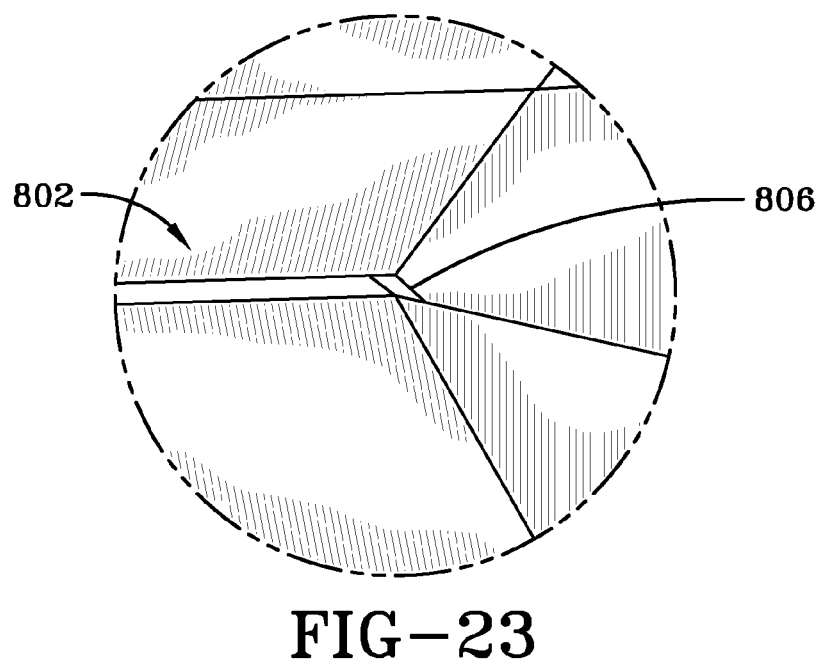
Figure 24:
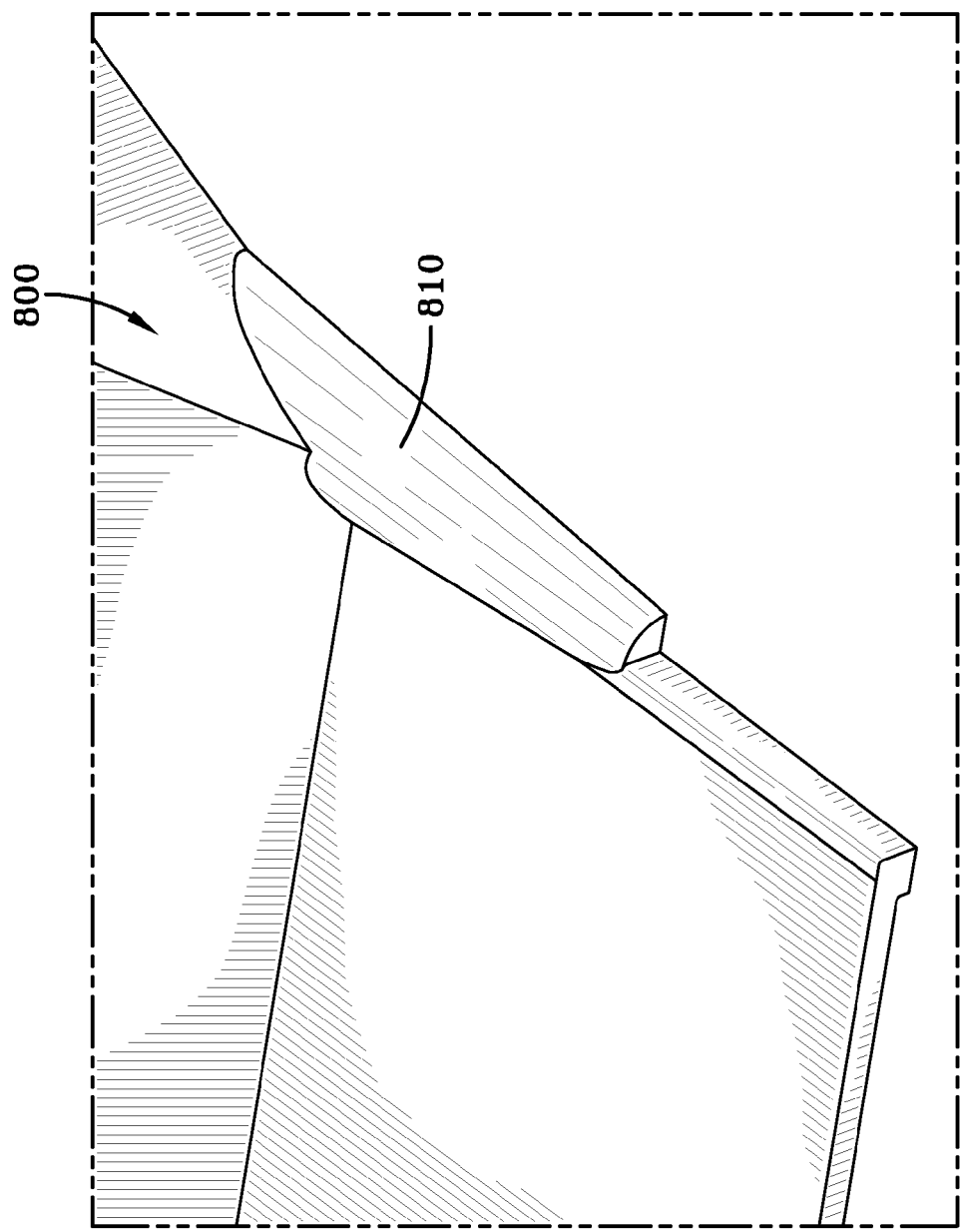

FIGS. 22-24 illustrate an alternate embodiment of a die 800 and die insert 802. The die 800 and insert 802 together form a die outlet 804. The die outlet 804 is a thin rectangular shaped passage with corners 806. The die outlet corners 806 have chamfers 808 which enlarge the die width so that the die width is greater than the ply width. FIG. 21 illustrates that the die outlet corners have a chamfer cone 810 which results in a localized increase in area.

In summary, the improved cross-head die assembly provides for individually fed cord strands captured with through hole guide, with no sharp edges to break the cords. The invention allows for easy change out of a cord package in minutes while the elastomer remains isolated in the flow channels. A broken cord can be replaced without the need to rethread all of the remaining cords. The invention further provides for an integrated screen filter and replacable flow channel inserts which allow the flow balance of the system to be modified.

While the present invention has been described with respect to certain specific examples, it will be apparent that many modifications and variations are possible without departing from the scope of the following claims.

What is claimed is:

1. A cross-head die assembly for use with an extruder, the cross-head die assembly comprising: an upper support block, a lower support block, and an interior section located therebetween; said interior section being connected to an inlet section having an inlet for receiving flow; said cross-head die assembly further including a first flow passage located between the upper support block and the interior section and being in fluid communication with the inlet; said cross-head die assembly further including a second flow passage located between the interior section and the lower support block and being in fluid communication with the inlet; said cross-head die assembly further comprising a removably mounted profile die located at an outlet end of the assembly, wherein the profile die has a removable insert, wherein a die outlet of the profile die has chamfered corners.

2. The cross-head die assembly of claim 1 wherein the interior section has an interior slot which extends from a first side of the assembly to an inlet of the die; and a removable cassette positioned in the interior slot.

3. The cross-head die assembly of claim 1 wherein the removable insert has wing shaped portions.

4. The cross-head die assembly of claim 1 wherein a die outlet of the profile die is formed by an angled passageway.

5. The cross-head die assembly of claim 2 wherein the removable cassette has a plurality of holes for receiving a ply cord.

6. The cross-head die assembly of claim 5 wherein each hole has an alignment groove which extends though said hole.

7. The cross-head die assembly of claim 2 wherein the interior slot has upper and lower sidewalls and lateral sidewalls.

8. The cross-head die assembly of claim 7 wherein the interior slot has an outlet end, wherein a nose of the removable cassette seals the outlet end of the interior slot from flow, so that the interior slot is isolated from the flow.

9. The cross-head die assembly of claim 1 wherein the removable insert has a lower surface forming a portion of the die outlet together with the profile die.

10. A cross-head die assembly for use with an extruder, the cross-head die assembly comprising: an upper support block, a lower support block, and an interior section located therebetween; said interior section being connected to an inlet section having an inlet for receiving flow; said cross-head die assembly further including a first flow passage located between the upper support block and the interior section and being in fluid communication with the inlet; said cross-head die assembly further including a second flow passage located between the interior section and the lower support block and being in fluid communication with the inlet; said cross-head die assembly further comprising a removably mounted profile die located at an outlet end of the assembly, wherein the profile die has a removable insert wherein the removable insert has opposed corners, wherein each corner has chamfer.

11. The cross-head die assembly of claim 10 wherein the removable insert has a sealing edge positioned against a die outlet hole.

12. A cross-head die assembly for use with an extruder, the cross-head die assembly comprising: an inlet section having an inlet for communicating flow from the extruder to one or more flow channels formed in a support block; and an outlet, a removably mounted profile die located at the outlet and in fluid communication with the one or more flow channels; wherein the profile die has a removable insert, wherein the removable insert has opposed corners, wherein each corner has a chamfer.

13. The cross-head die assembly of claim 12 wherein the removable insert has a lower surface forming a portion of a die outlet together with the die.

14. A cross-head die assembly for use with an extruder, the cross-head die assembly comprising: an inlet section having an inlet for communicating flow from the extruder to one or more flow channels formed in a support block; and an outlet, a profile die located at the outlet and in fluid communication with the one or more flow channels; wherein said profile die has a removable insert having a lower surface forming a portion of a die outlet together with the profile die, wherein the removable insert has opposed corners, wherein each corner has a chamfer.

* * * * *